United States Patent
Karem et al.

(10) Patent No.: US 11,780,555 B1
(45) Date of Patent: Oct. 10, 2023

(54) GROUND EFFECT WING HAVING A FLAPPING WINGTIP

(71) Applicant: Karem Aircraft, Inc., Lake Forest, CA (US)

(72) Inventors: Abraham Karem, Santa Ana, CA (US); John Paul Parcell, Irvine, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 0 days.

(21) Appl. No.: 17/880,021

(22) Filed: Aug. 3, 2022

(51) Int. Cl.
*B64C 3/38* (2006.01)
*G01C 13/00* (2006.01)
*B64D 47/00* (2006.01)
*B64C 19/00* (2006.01)

(52) U.S. Cl.
CPC ............... *B64C 3/38* (2013.01); *B64C 19/00* (2013.01); *B64D 47/00* (2013.01); *G01C 13/004* (2013.01)

(58) Field of Classification Search
CPC ......... B64C 3/38; B64C 19/00; B64C 35/006; B64C 35/007; B64C 23/072; B64D 47/00; G01C 13/004
See application file for complete search history.

(56) References Cited

U.S. PATENT DOCUMENTS

| | | | |
|---|---|---|---|
| 6,230,835 B1 | 5/2001 | Fischer | |
| 6,547,181 B1 | 4/2003 | Hoisington | |
| 7,095,364 B1 * | 8/2006 | Rawdon | G01S 13/87 701/4 |
| 9,714,080 B2 | 7/2017 | Bradshaw | |
| 2007/0262207 A1 * | 11/2007 | Morgenstern | B64C 23/04 244/214 |
| 2017/0073062 A1 * | 3/2017 | Firth | B64C 23/069 |

OTHER PUBLICATIONS

"Variable-sweep wing," Wikipedia.org. https://en.wikipedia.org/w/index.php?title=Variable-sweep_wing&oldid=1086966138. 12 pages, Pub date May 9, 2022.

* cited by examiner

*Primary Examiner* — Rodney A Bonnette
(74) *Attorney, Agent, or Firm* — Fish IP Law, LLP

(57) ABSTRACT

An up-down flapping wingtip is provided for a ground effect vehicle. The wingtip is positionable at an anhedral angle to control the wingtip clearance from ground. Variable wingtip clearance reduces the risk of damage due to collision with the ground or water, thereby permitting more efficient flight at lower altitude with an equivalent safety. The wingtip is positioned by a wingtip flap and an actuator. The wingtip anhedral angle is controlled by a flight control system. A sensor is included for determining whether an object lies in the path of the wingtip. The sensor communicates with the flight control system in order to vary the flapping angle of the wingtip to increase clearance from the ground or water, thus avoiding impact with the object. The wingtip anhedral angle is reduced to increase the wingspan for flight out of ground effect.

17 Claims, 4 Drawing Sheets

GROUND EFFECT WING HAVING A FLAPPING WINGTIP

FIELD OF THE INVENTION

The field of the invention is a ground effect aircraft.

BACKGROUND

Ground effect aircraft offer reduced lift-induced drag, and as a result allow lighter wings of shorter span and lower wing aspect ratio. Such aircraft are naturally more practical in flight over calm bodies of water.

Numerous prior art aircraft were designed to take advantage of ground effect over water. For example, the prior art Russian "Caspian Sea Monster" has advantageous ground effect related to the ratio of distance from the water surface to the size of the aircraft. These aircraft tend to be very large or be restricted to fly only in surface effect on very calm water.

The Pelican surface effect aircraft proposed by Boeing was designed to have a wingspan of 500 feet and maximum take-off weight of 6,000,000 Lbs. If the Pelican had ever been built, it would have been 5-fold heavier than the largest aircraft ever flown. The Pelican was designed to take-off and land from ground, and fly either over water or airborne up to 25,000 feet.

The ShinMaywa US-2 is a sea search and rescue aircraft developed specifically to take-off and land on Sea State 5 (SS5) (10 feet significant waves and 13 feet extreme waves).

The passenger transport flying boats which peaked with the Saunders-Rowe Princess were designed to fly across the Atlantic at up to 39,000 feet, and take-off and land on calm water such as rivers and ship harbors.

Fischer (U.S. Pat. No. 6,230,835-B1) teaches a ground effect vehicle with outer wing segments that rotate between touching the ground surface and up to 90 degrees. Takeoff and landing airspeeds are reduced by minimizing the distance between rear-edge flaps and the ground surface, so the outer wing segments are positioned near the ground at low airspeeds. At higher airspeeds where less nose-up pitch angle is required, consistent aircraft attitude is desired for passenger comfort and hull to ground clearance. To achieve this, the outer wing segments are raised to reduce the effective lifting wing area. The outer wing segments' variable positions have multiple benefits in other operational conditions: reduced span for navigating narrow waterways, performing coordinated turns, acting as side rudders, and avoiding obstacles. Fischer anticipated wave collisions with the outer wing segments, so the outer wing segment is mounted on a spring to allow compliance during collisions. Significantly, Fischer's outer wing segments are both relatively short, and alter sweep of the wing when moving of the wing segments up and down.

Fischer and all other publications discussed herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

It is now contemplated that a market may emerge for a very challenging new type of aircraft, which would ideally combine features of each of the aircraft discussed above, namely cruise at over 20,000 feet, take-off and land on SS5 waves, and have efficient cruise in surface effect, and all without the excessive size of the Boeing Pelican. None of the aircraft satisfy all of those requirements, including the aircraft disclosed in Fischer U.S. Pat. No. 6,230,835.

SUMMARY OF THE INVENTION

The inventive subject matter provides apparatus, systems and methods in which drag of an aircraft flying over a water surface is reduced due to ground effect, by rotating outboard wing segment relative to the corresponding inboard wing segment in a "flapping" up (dihedral) and down (anhedral) motion.

In preferred embodiments, each of the outboard wing segments comprises at least 8% of the wing span. Also in preferred embodiments, the aircraft includes a first sensor that detects an alteration in a wave height in a flight path of the aircraft, and at least one control device to rotate the outboard wing segment at least in part according to information provided by the first sensor.

Flapping motion of the outboard wing segments can be controlled in any desirable control device(s), including for example using a trailing edge control surface as a control device, and using an electrically, pneumatically or hydraulically operated mechanical actuator as a control device.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. Moreover, all numerical ranges contemplated herein should be interpreted to be within the bounds of practicality.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

DETAILED DESCRIPTION

Figure 1:
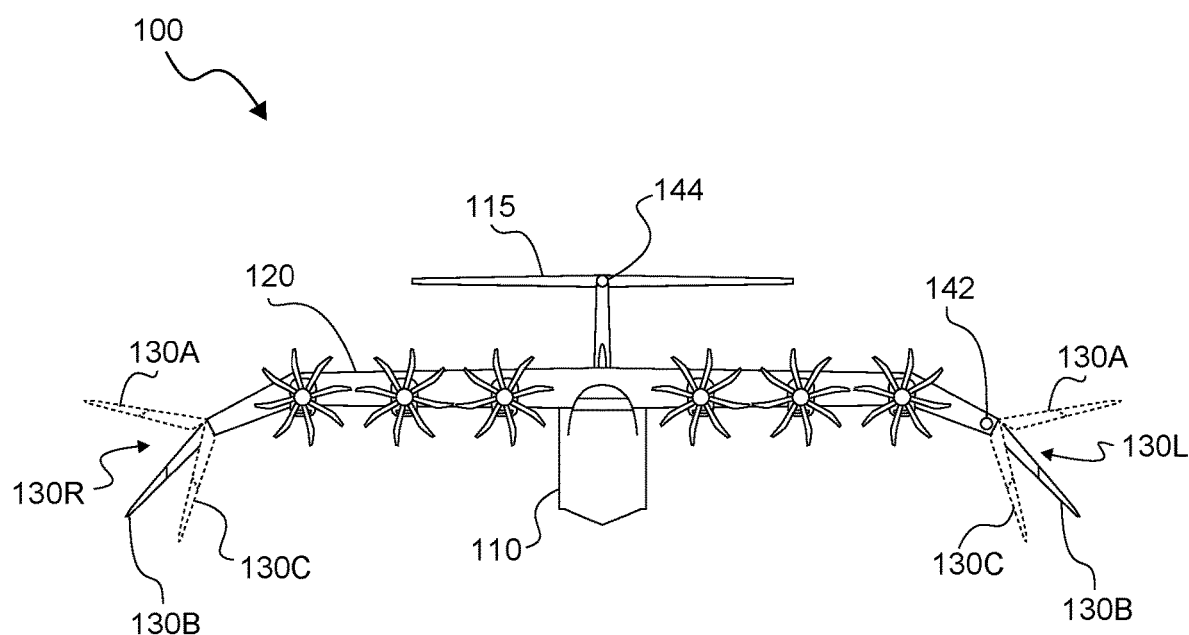
FIG. 1 is a front view of an aircraft having flappable out wing segments and both short and long range wave height sensors.

In FIG. 1, aircraft 100 generally includes a fuselage 110, a wing 120, and a tail 115. At the left and right ends of the wing 120 are outboard wing segments 130 that can be rotated up and down. The outboard wing segments 130L 130R are shown in multiple rotated positions as 130A, 130B, and 130C, although it should be appreciated that in different embodiments, the outboard wing segments 130 can be rotated up and down across a range of up to 45°, 90°, 120°, 150°, and 180°, respectively.

In preferred embodiments, each of the outboard wing segments comprises at least 8% of the wing span. In other contemplated embodiments the maximum contemplated portion of the wingspan utilized by each of the flapping outboard wing segments is 15%, 20%, 25%, 30% and 35%, respectively.

Such large outboard wing segments are contemplated even, and perhaps especially, for aircraft with long wing spans. Thus, it is contemplated that rotation of a contemplated outboard wing segment can result in a tip of the outboard wing segment having potential vertical displacement of up to 4, 6, or 8 meters or even higher if the folding is up to 90°.

In view of the relatively large size of the contemplated outboard wing segments, the large wing span, and the low altitude at which such the aircraft will likely be flying, it is contemplated that an outboard wing segment can be advantageously rotated upwards from a nominal position during banking of the aircraft. Conversely, when flying above a ground effect altitude, both outboard wing segments can advantageously be reverted into a nominal position.

In the example of FIG. 1, the aircraft 100 has six propellers. Alternative aircraft with greater or fewer number of propellers or tilt-ring rotors are also contemplated, as well as aircraft with any manner of jet propulsion.

Figure 2:
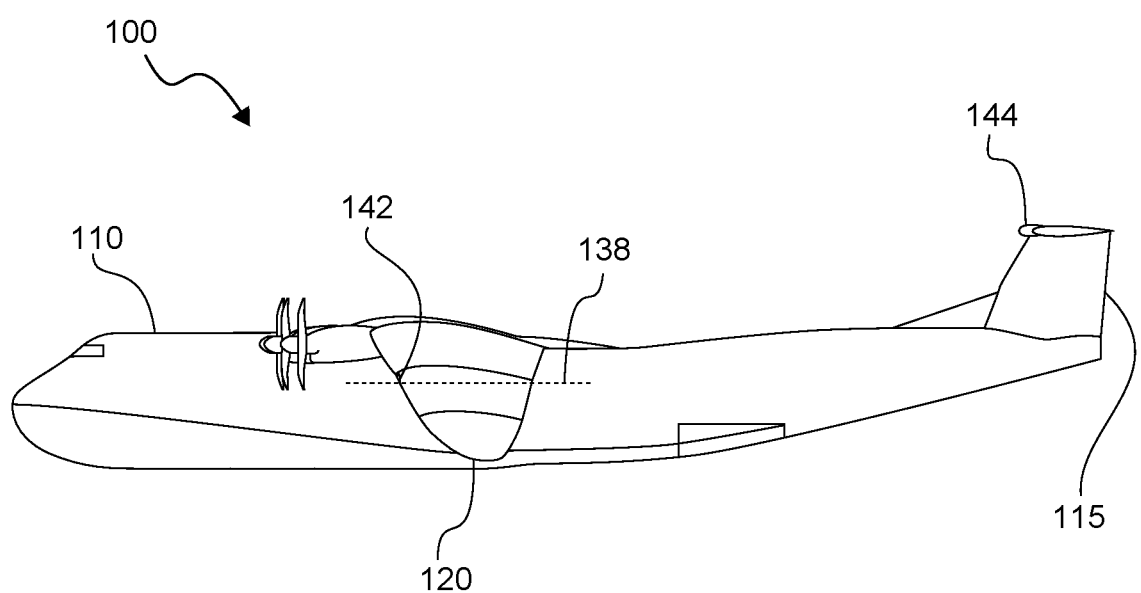
FIG. 2 is a left side view of the aircraft of FIG. 1.

FIG. 2 is a left side view of the aircraft 100 of FIG. 1, and depicts axis 138 about which the left outboard wing segment 130L rotates. The axis 138 is preferable oriented to be horizontal when the aircraft is in horizontal flight, which results in the left outboard wing segment 130L rotating up and down without also increasing or decreasing sweep. Such rotation, up and down without also increasing or decreasing sweep of the wing segment by more than 10° is referred to herein as a "flapping" motion. The right outboard wing segment 130L should be considered to rotate about a corresponding right axis (not shown), which is also preferably oriented to be horizontal when the aircraft is in horizontal flight.

In preferred embodiments, flapping of the wing segments is accompanied by less than 5° of increase or decrease in sweep of the wing segments, more preferably less that 2°, and most preferably no increase or decrease in sweep of the wing segments.

Both FIGS. 1 and 2 include short range wave sensors 142 and a long range wave sensor 144. The short range wave sensors 142 are preferably located on the wing, between the outboard wing segments 130L, 130R, and the fuselage 110. This positioning facilitates observation of wave height close to the wing segments 130L, 130R. The long range wave sensor 144 is preferably located on an upper portion of the tail 115 so that it can view wave heights several kilometers ahead, along the expected flight path. Both short range wave sensors 142 and long range wave sensor 144 can utilize radar, or any other suitable detection means.

Figure 3:
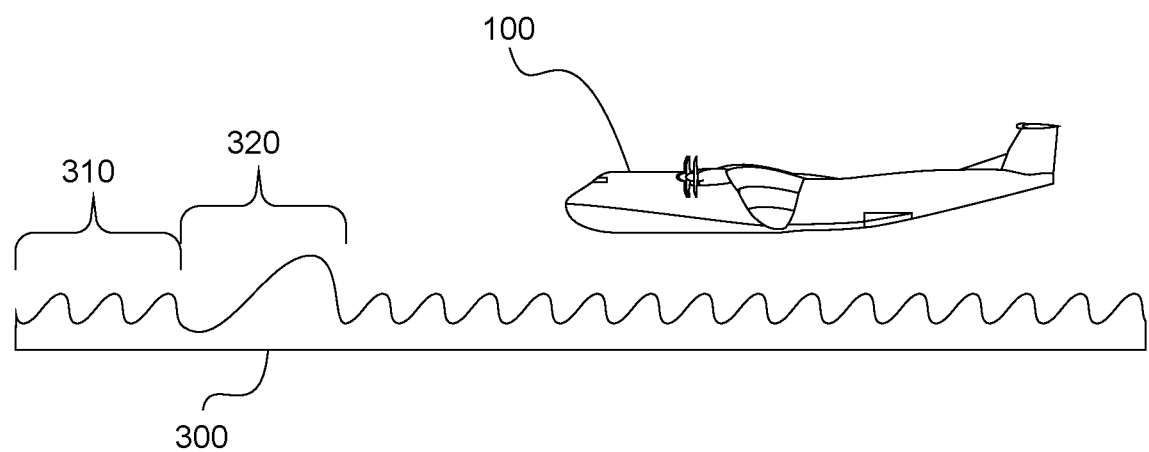
FIG. 3 is a left side view of the aircraft of FIG. 1, flying with ground effect over water.
Figure 4:
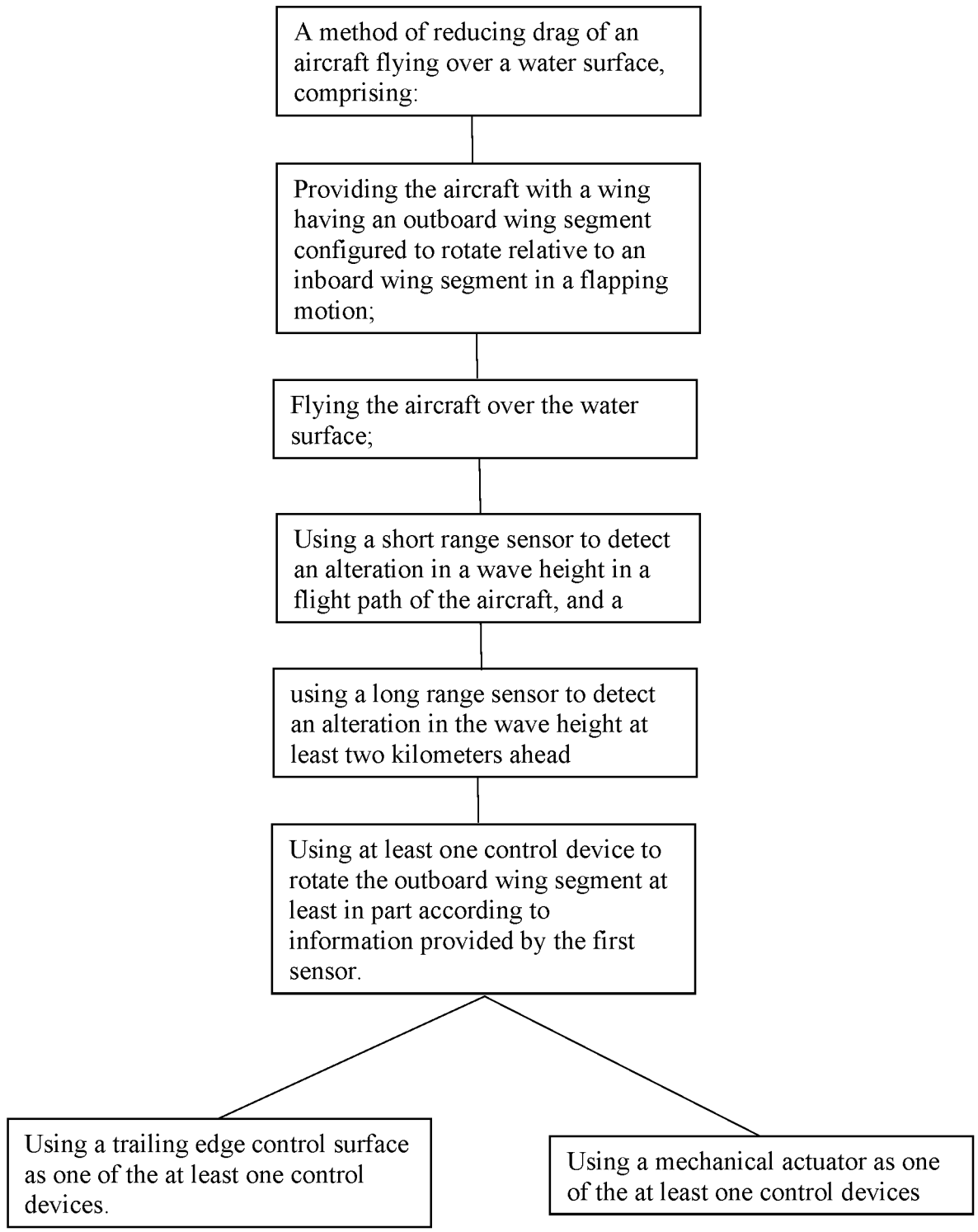
FIG. 4 is a flowchart depicting a method of the inventive subject matter.

FIG. 3 is another left side view of the aircraft 100 of FIG. 1, flying with ground effect over water 300. The water includes average size waves 310 of height 0.3 to 1 meters, and much larger waves 320 of height 1.25 to over 4 meters. Waves 310 and 320 are not drawn to scale. Short range wave sensors 142 are positioned and oriented to detect nearby waves 310, and to send relevant information to actuators (not shown) to rotate the outboard wing segments 130L and 130R to avoid the detected waves 310. Long range wave sensors 142 are positioned and oriented to detect the much larger waves at sufficient distance to allow the aircraft to move to take evasive maneuvers to avoid the detected waves 320.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of reducing drag of an aircraft when flying over a water surface, comprising:
providing the aircraft with a wing having an outboard wing segment configured to rotate relative to an inboard wing segment in a flapping motion, across an angle of at least 45° between a positive dihedral orientation and a negative (anhedral) orientation, and where the outboard wing segment comprises at least 8% of a span of the wing;
flying the aircraft over the water surface;
using a short range sensor to detect an alteration in a wave height in a flight path of the aircraft;
using a long range sensor to detect an alteration in the wave height at least two kilometers ahead; and
using at least one control device to rotate the outboard wing segment at least in part according to information provided by the short range sensor.

2. The method of claim 1, further comprising using a trailing edge control surface as one of the at least one control devices.

3. The method of claim 1, further comprising using a mechanical actuator as one of the at least one control devices.

4. The method of claim 1, further comprising positioning the short range sensor on the wing.

5. The method of claim 1, further comprising positioning the long range sensor on a tail of the aircraft.

6. The method of claim 1, further comprising rotating the outboard wing segment away from a nominal position during banking of the aircraft.

7. The method of claim 1, further comprising rotating the outboard wing segment into a nominal position when flying the aircraft above a ground effect altitude.

8. The method of claim 1, further comprising rotating the outboard wing segment such that a tip of the outboard wing segment has a potential vertical displacement of 8 meters.

9. The method of claim 1, wherein the angle over which the wing segment is configured to rotate up to 90°.

10. The method of claim 1, wherein the angle over which the wing segment is configured to rotate up to 120°.

11. The method of claim 1, wherein the angle over which the wing segment is configured to rotate up to 150°.

12. The method of claim 1, wherein the angle over which the wing segment is configured to rotate up to 180°.

13. The method of claim 1, wherein the outboard wing segment comprises at least 15% of the span of the wing.

14. The method of claim 1, wherein the outboard wing segment comprises at least 20% of the span of the wing.

15. The method of claim 1, wherein the outboard wing segment comprises at least 25% of the span of the wing.

16. The method of claim 1, wherein the outboard wing segment comprises at least 30% of the span of the wing.

17. The method of claim 1, wherein the outboard wing segment comprises at least 35% of the span of the wing.

\* \* \* \* \*